United States Patent [19]
Yulkowski

[11] 3,762,753
[45] Oct. 2, 1973

[54] MOLDED BEARING FOR CAST DOOR LEVERS

[75] Inventor: Leon Yulkowski, Pontiac, Mich.

[73] Assignee: Admiral Lock Company, Pontiac, Mich.

[22] Filed: Feb. 16, 1972

[21] Appl. No.: 226,764

[52] U.S. Cl. ............... 292/349, 287/20.2, 287/53 H
[51] Int. Cl. ........ E05b 3/00, F16b 2/20, F16d 1/06
[58] Field of Search............ 292/347, 349, DIG. 38; 287/DIG. 2, 20.2, 53 H; 74/584; 16/DIG. 24

[56] References Cited
UNITED STATES PATENTS

| | | | |
|---|---|---|---|
| 1,590,680 | 6/1926 | Gates | 292/347 X |
| 3,400,446 | 9/1968 | Yulkowski | 292/347 X |
| 3,434,752 | 3/1969 | Russell | 292/356 |
| 3,386,306 | 6/1968 | Kenyon | 74/548 |
| 3,295,871 | 1/1967 | Naimer | 287/53 H |
| 3,498,650 | 3/1970 | Stranger | 287/53 H |

*Primary Examiner*—Marvin A. Champion
*Assistant Examiner*—William F. Pate, III
*Attorney*—Robert A. Sloman

[57] ABSTRACT

A handle construction, as for a door, wherein the handle is of the lever or knob type, preferably, with its hub formed with a socket for receiving a spindle of the door lock or door moving means; the hub having a molded member on its exterior and with a bearing liner which eliminates the normal sloppy fit between the spindle and the handle hub and which provides a good and tight fit between the hub and the spindle, and/or between the handle bearing and rosette.

9 Claims, 7 Drawing Figures

PATENTED OCT 2 1973　　3,762,753
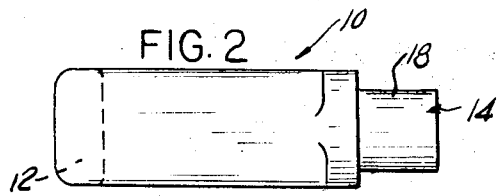
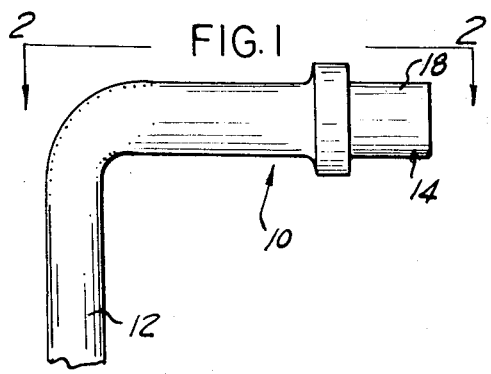
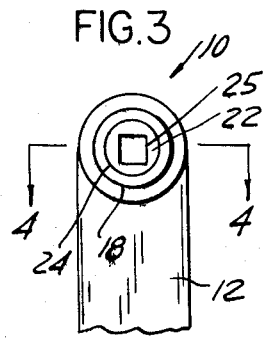
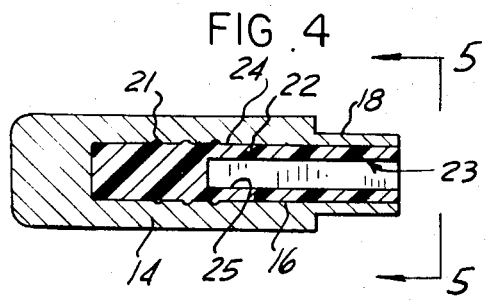
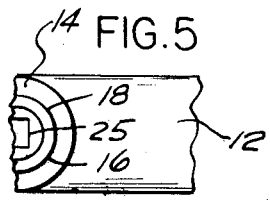
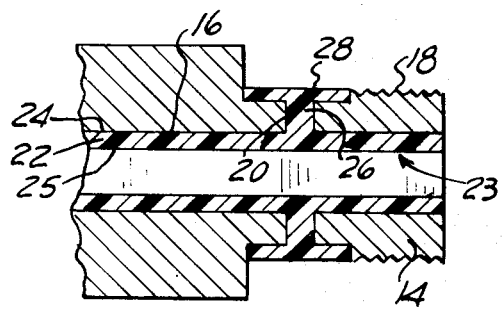
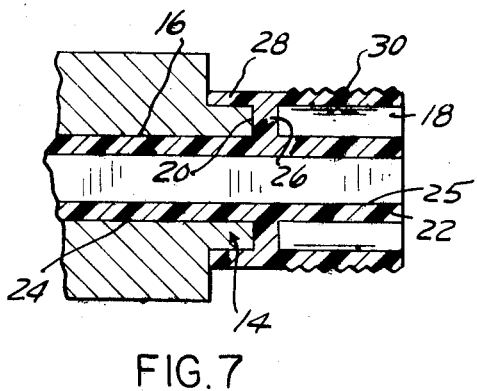

3,762,753

MOLDED BEARING FOR CAST DOOR LEVERS

GENERAL DESCRIPTION

Door handles have hubs with polygonal sockets receiving spindles of door knobs or the like. In the conventional assembly between a handle shank and a spindle, generally the socket of the hub is oversized with respect to the spindle, providing a loose fit, and generally requiring set screws to hold the hub and the spindle firmly together to eliminate play.

Generally also, the exterior of the hub is suitably machined, as for example by being threaded, and suitably machined for dimensioning, so that the hub fits quite closely in the opening of a conventional rosette and the hub and rosette are maintained firmly in assembly by a clamping nut or other means.

OBJECTS OF THE INVENTION

It is an object of the invention to provide a molded metal door handle, particularly in its hub portion, with an injection molded or cast plastic member, which may be of any suitable plastic material including those commonly known as plastics, but also including such materials as zinc and aluminum which can be diecast with facility. Such member has an interior liner portion providing a bearing and a proper fit between an elongated socket in the hub and a spindle, such bearing having its interior surface formed polygonal to fit the spindle and its exterior surface preferably round to fit within the rosette.

When such a member is properly formed and particularly when it is made of material such as plastics, or even diecast, zinc or aluminum, it can be dimensioned to fit closely on a spindle and by itself, form a firm and grasping and enduring tight fitting connection between the spindle and the hub, of a nature to permit easy assembling of the parts when the door lock is installed, and an easy removal of the spindle from the hub when desired, yet insuring the retention of a good and tight and firm fit and a grasping fit between the hub and the spindle.

Variations in the form of the member are contemplated and are shown in the appended drawing in connection with a preferred embodiment and its modifications, shown only by way of illustration.

THE DRAWING

FIG. 1 fragmentarily shows a handle in elevation.

FIGS. 2, 3, 4 and 5 are views as if on lines 2—2, 3—3, 4—4 and 5—5 of FIGS. 1, 1, 3, and 4 respectively.

FIGS. 6 and 7 are enlarged cross sectional fragmentary views of modified forms.

DETAILED DESCRIPTION

FIGS. 1 to 5 show a door handle construction 10 having a manually graspable portion 12 and a spindle and rosette receiving hub portion 14. The hub, preferably of metal, has an elongated socket 16 for receiving a spindle and an exterior wall for receiving a rosette and a clamping nut or other means for clamping the hub 14 and a rosette together.

The basic form of the invention is shown in FIGS. 1 to 5 and these show the hub 14 as having a socket 16 in which is a liner portion 22 of a hollow plastic molded member 23, portion 22 having an exterior surface complementing the surface of the socket 16 and a polygonal interior surface 25 complementing and receiving and closely fitting a spindle. The exterior of liner 22 has ridges 21 nesting in corresponding recesses in said hub to prevent axial removal of the liner.

FIGS. 6 and 7 show modifications, each including, for example, passage as at 20 in hub 14 which connects socket 16 and wall 18, with the liner 22 connected by an integral transverse portion 26 to an integral cylindrical exterior portion 28 spaced from and surrounding liner 22 and molded on hub surface 18.

FIG. 7 shows portion 28 molded with thread 30 for a rosette clamping nut.

It will be understood that portion 28, whether or not equipped with threads 30, is cast and dimensioned for properly fitting and receiving a rosette. If threads 30 are provided, these will be of proper form for receiving the threads of a rosette clamping nut.

All of the parts of the member 23, whatever be the modified form employed, are integral and are integrally molded or cast. In the preferred form, all of the bearing parts are cast in situ in the hub 14 either by any suitable casting method or molding method such as diecasting or injection molding and may be of any suitable plastic material or material found suitable for the purpose such as diecast, zinc or aluminum or conventional plastic materials, whose selection forms no part of the present invention which relates itself mainly to the basic concept of providing a liner and bearing in a hub. Such liner will provide the bearing and the receiving means for the spindle, and in the preferred forms, will include an exterior shell 28 for receiving rosettes, and if desired, with threads 30 or other means for cooperating with the threads of a rosette clamping nut or other securing device.

Properly dimensioned and formed bearings will be found to provide a firm yet easily separable and easily assemblable grasp between the complementary spindle and the hub and between the compelementary rosette and the hub, where the bearing is provided with shell 28, and with proper coaction between a clamping nut and the bearing where the bearing is provided with shell 28 and thread 30.

The use of the bearing liner 22 between the hub and a spindle provides a good firm and close fit between the hub and the spindle which retains its grasping quality permanently while permitting easy separation and assembly of the parts.

Another advantage is that the injection molding process, done in a die, is very precise and accurate and eliminates the possibility of the spindle hole being eccentric to the bearing (which frequently happens in a casting), and also that it automatically adjusts for any angular error which might exist in the molded metal part.

CONCLUSION

Now having described the handle construction herein disclosed, reference should be had to the claims which follow, which determine the scope of the invention for which protection is here sought.

I claim:

1. A handle construction having a manually graspable portion and a spindle and rosette reeiving hub:
    said hub having an elongated socket for receiving a spidle, and an exterior wall surrounding the socket and adapted to receive a surrounding rosette and a clamping device;

said socket containing a hollow molded member formed with an interior bearing portion having a polygonal interior surface dimensioned to receive and fit closely on the spindle, said member having a cylindrical exterior portion, integral with and spaced from the interior bearing portion and surrounding the exterior wall of the hub; said hub having a passage connecting said socket and said exterior wall; with a connecting portion of the molded member in said passage between the interior bearing portion and the exterior portion of the molded member.

2. A construction according to claim 1 wherein, the exterior portion is formed with a fastener engaging means.

3. A construction according to claim 2, said means being threads.

4. A construction according to claim 1 wherein the member is diecast.

5. A construction according to claim 1 wherein the hub is metal.

6. A construction according to claim 1, wherein the bearing is cast or molded in and on the hub portion, poured as a liquid and then solidified.

7. A construction according to claim 1, wherein the bearing is cast or molded in and on the hub portion, poured as a liquid and then solidified, and wherein, the exterior portion of the member is molded with an external thread for said clamping device.

8. A construction according to claim 1, wherein the bearing is cast or molded in and on the hub portion, poured as a liquid and then solidified, and wherein, the exterior portion of the member is molded with an external retaining means for said clamping edvice.

9. In the handle construction of claim 1, an external rib on said hollow molded member interlocked with a corresponding recess in the hub socket.

* * * * *